United States Patent [19]

Langberg

[11] Patent Number: 4,583,292

[45] Date of Patent: Apr. 22, 1986

[54] LOW INERTIA X-Y CABLE DRIVE

[76] Inventor: Edwin Langberg, 13 Valley Forge Ct., Marlton, N.J. 08053

[21] Appl. No.: 640,043

[22] Filed: Aug. 10, 1984

[51] Int. Cl.[4] .............................................. G01B 5/24
[52] U.S. Cl. ...................................... 33/1 M; 33/138
[58] Field of Search .............. 33/1 M, 1 PT, 137, 138, 33/139, 189; 346/139 R, 139 B

[56] References Cited

U.S. PATENT DOCUMENTS

| 3,492,421 | 1/1970 | Cameron | 33/1 M X |
| 3,553,842 | 1/1971 | Gerber et al. | 33/1 M |
| 3,564,533 | 2/1971 | Linn | 33/1 M X |
| 3,665,608 | 5/1972 | Stockebrand | 33/1 M |
| 4,412,383 | 11/1983 | Landa | 33/1 M |

FOREIGN PATENT DOCUMENTS 1188771 4/1970 United Kingdom ................ 33/1 M

Primary Examiner—Harry N. Haroian

[57] ABSTRACT

The invention provides for an inexpensive plotter/digitizer which can be attached to existing drafting boards of varying sizes. The device uses flexible links, such as cables. Length, speed, and tension of the links is monitored by sensors. The speed, accuracy, and line quality of plotting are improved by reduction of the weight of moving components and mechanical simplification of the drive mechanism. Trajectory Control for more than two link drives for prescribed two-dimensional motion is described together with Stationary Control which maintains required tension on cables. Microprocessor controlled, multimode operation of individual drives is indicated.

10 Claims, 12 Drawing Figures

LOW INERTIA X-Y CABLE DRIVE

FIELD OF INVENTION

This invention relates to a new device used to move an object along a surface. It specifically relates to x-y plotters, where the object moved is a marking instrument which draws a line on a plotting medium. In addition to, or in place of plotting, the device can also provide a digitizing function.

PRIOR ART

Many plotters use flexible links, such as wire cables, timing belts or chains. The great majority of these devices use such links in drives for motion confined to the x and the y direction. To constrain the motion along x and y directions, such drives use rigid components which add greatly to the inertia of the drives and confine the plotting surface to a specific size.

The speed, accuracy, and line quality of plotting depend to a large extent on the precision and/or the inertia of the drive components. It is therefore desirable to reduce the weight of the moving components and to simplify the drive mechanisms. This can be accomplished by eliminating, as much as possible, the rigid drive components and designing a plotter largely by means of flexible links.

Designs based on cable links in a triangulation mode have been proposed by Linn (U.S. Pat. No. 3,564,533) and by Landa (U.S. Pat. No. 4,412,383). The preferred embodiment of the present invention also uses cable links; however, it incorporates fundamental differences and significant advantages over the state of the art. It uses force sensors which convert the tension on the cables to electrical feedback signals which, in conjunction with the cable length derived feedback signals, are used to control the cable motors.

This addition of force sensor signals used for control loop feedback, results in a very significant improvement of dynamic operation of cable driven plotters.

This invention addresses the design of a cable guiding mechanism so that the cable length correctly represents the position of the center of the marking pen housing.

OBJECT AND SUMMARY OF THE INVENTION

The object of the invention is to provide a low inertia, accurate x-y drive. A plotter based on such drive can quickly and accurately plot on a large surface. Another object of the invention is to provide an inexpensive plotter which can be attached to existing drafting boards of varying sizes. A further object of the invention is to combine the plotting and the digitizing functions. Other and further objects of the invention will appear from the following description of the preferred embodiment.

DESCRIPTION OF THE PREFERRED EMBODIMENT

Figure 1:
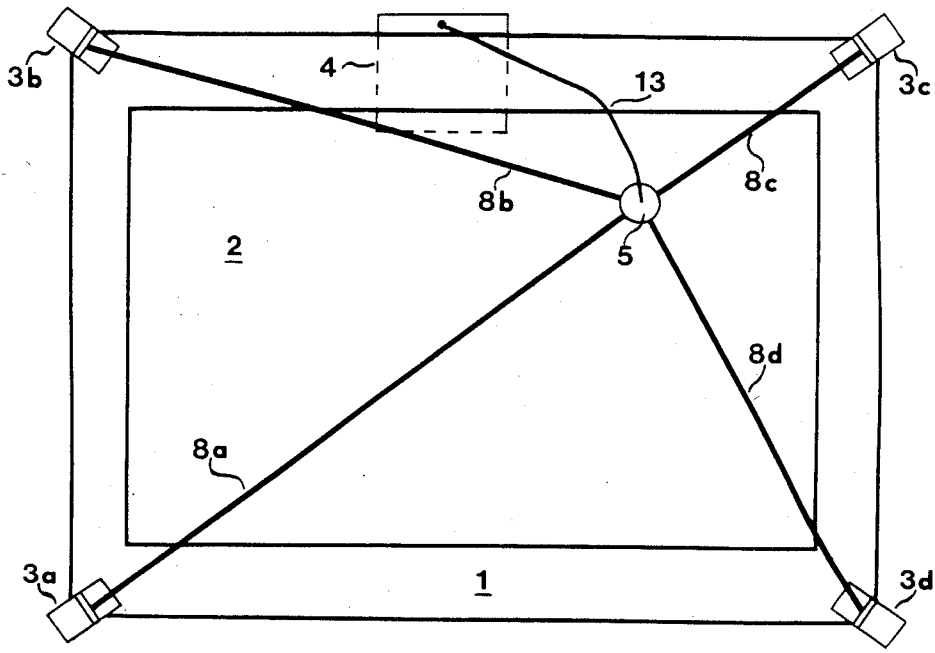
FIG. 1 shows a drafting board equipped to serve as the plotter/digitizer.

Shown in FIG. 1 is the drafting board 1 covered by the drafting material 2. The board 1 is equipped for plotting and digitizing by attachment of four link guiding mechanisms 3a, 3b, 3c, and 3d located at the four corners of board 1. The four link guiding mechanisms 3 are identical in construction. The numbers alone are used for the generic description applicable to all drives. Letters are used in conjunction with numbers in order to distinguish between the drive elements corresponding to individual drives: "a" for the drive in the lower left corner; "b" for the drive in the upper left corner; "c" for the drive in the upper right corner; and "d" for the drive in the lower right corner. The same notation is used for other components.

Flexible links used are wire cables, although belts, chains, or other flexible links could be employed. Four cables 8a, 8b, 8c, and 8d terminate at a marker housing assembly 5. Marker housing assembly 5 constitutes the load driven by flexible links 8.

The trajectory control unit 4 is located under the board 1 and so is shown mostly by dashed lines in FIG. 1. Supply line 13, consisting of flexible plastic ink supply tube and flexible electrical cable interconnecting marker housing assembly 5 and trajectory control unit 4, loops loosely in such a fashion that housing 5 can reach any position on the surface of the drafting material 2.

Figure 2:
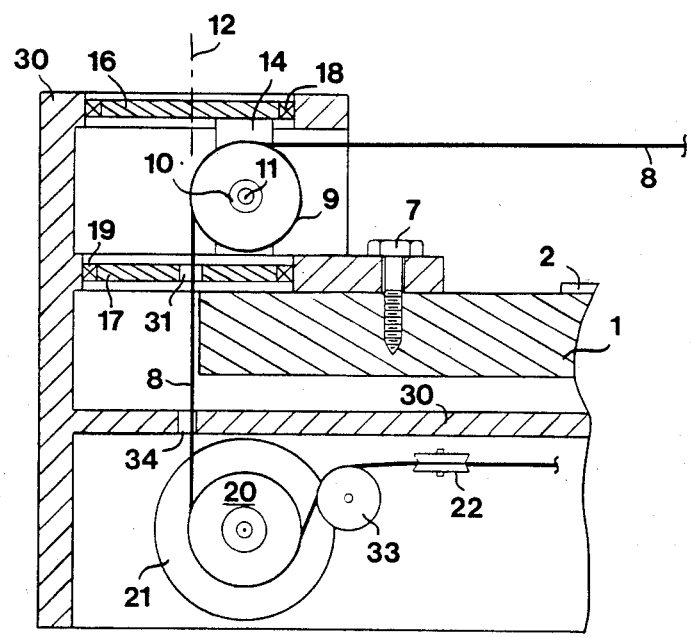
FIG. 2 shows the side view of a portion of a link drive.

Shown in FIG. 2 is the side cross-section view of a portion of link guiding mechanism 3 in the plane of cable 8. Cable 8 rides on a pulley 9 which is supported on bearing 10 against a shaft 11. The shaft 11 is in turn supported on two bars 14, and 15 (not shown) which attach to upper disk 16 and lower disk 17 which in turn rotate on inner races of ball bearings 18 and 19. The outer race is press-fitted rigidly to the frame 30 of the cable drive.

The center of bearings 18 and 19, which defines the axis of rotation 12, coincides with the vertical direction of cable 8. Cable 8 stretches between pulleys 9 and 20 and passes through the hole 31 in disk 17 and hole 34 in frame 30. Pulley 20 is mounted on the shaft of an optical shaft encoder 21 and optionally on the shaft of a tachometer 49. Optical shaft encoder 21 and tachometer 49 serve as cable length parameter sensors which generate feedback signals used for control, as described in conjunction with FIG. 6. The exit of cable 8 from pulley 20 is to another pulley 33. Frame 30 is attached to board 1 using bolt 7.

Figure 3:
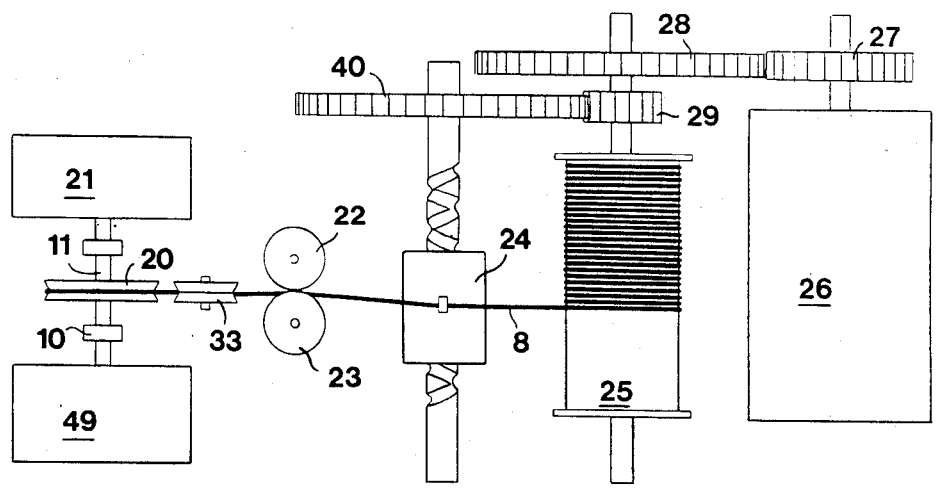
FIG. 3 shows the bottom view of a portion of a link drive.

FIG. 3 shows additional detail of the guiding mechanism, namely the winding mechanism. In FIG. 3, further travel of cable 8 can be followed by noting that pulleys 22 and 23 serve to confine the transverse motion of the cable in relationship to the pulley 33 while a ball reverser 28 guides cable 8 so that it is wound (or unwound) uniformly and orderly onto the take-up cylinder 25. Both the ball reverser 24 and the take-up cylinder 25 are driven by a servo motor 26 through gears 27, 28, 29 and 40.

Figure 5:
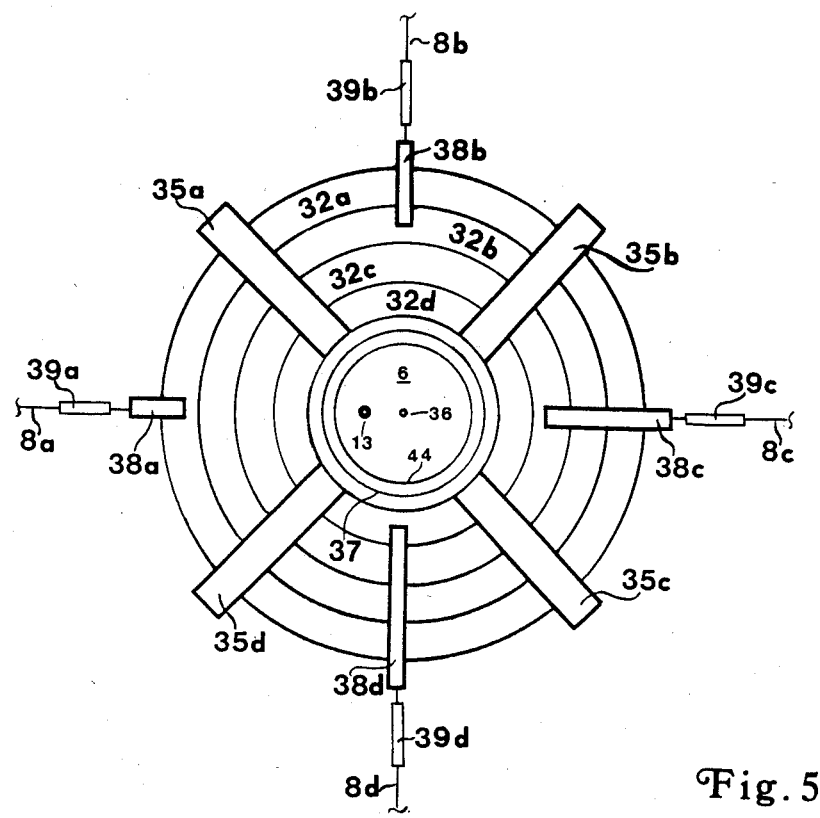
FIG. 5 shows the top view of the marker housing assembly.
Figure 4:
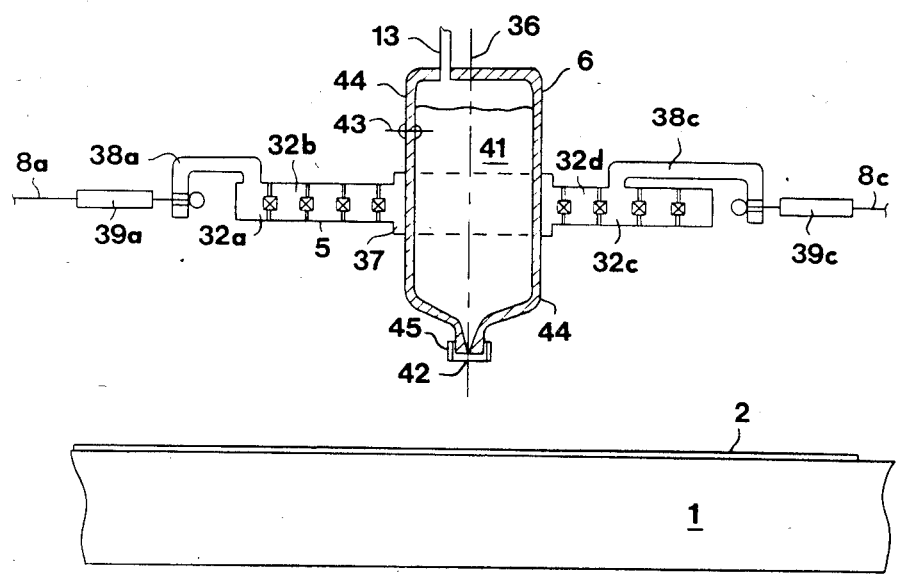
FIG. 4 shows the side cross-section view of the marker housing assembly.

Referring now to FIGS. 4 and 5, FIG. 4 shows a side cross-section view in the plane of cable 8a and 8c of the details of marker housing assembly 5 which supports the marker 6, and FIG. 5 shows the top view of the marker housing assembly 5 and the marker 6. The assembly 5 consists of four concentric bearing rings 32a, 32b, 32c, and 32d which rotate around a common axis 36. Axis 36 corresponds also to the axis of the marker 6 and determines the instantaneous location of the trace on the drafting material 2. Four brackets 38a, 38b, 38c, and 38d are attached to the corresponding rings 32. The rings are held together from top and bottom by four U-shaped brackets 35 attached to the cyliner 37. Cylinder 37 serves also as a housing for the marker 6.

Strain gage 39 acting as a force sensor of cable tension is attached to the other end of corresponding bracket 38. Cable 8 is connected to the other end of the force sensors 39. Force sensors 39a and 39d are easily detachable from bracket 38a and 38d to provide access to the drafting material 2, when required. Force sensor 39 generates a feedback signal used for control, as discussed in conjunction with FIG. 6.

Referring again to FIGS. 4 and 5, marker 6 is an ink jet device which consists of the ink container 44 filled with ink 41. At the bottom of the ink container 44 there is a narrow nozzle 42. An electrode 43 maintains a high electrical potential on the ink 41. The ink container 44 is made out of insulating material so that the ink electrical potential does not create a shock hazard. At the exit of the nozzle, there is an electrode 45 which is kept at the ground potential. The potential difference between the ink 41 and the electrode 45 generates an ink jet. When the potential is removed from the ink electrode, the jet ceases and drawing of the trace is stopped. Ink is fed through a flexible plastic tube incorporated in the supply line 13 from the ink pump 80 located in the control unit 4 shown in FIG. 7. Electrical wiring to the ink jet and from the strain gages is also run along supply line 13.

The operation of an ink jet such as described above is well known in the art and is, for example, described in an article by Muto, Kaieda and Kamimwia in the *Journal of Applied Photographic Engineering*, Volume 6, Number 3, June 1980, page 78. Many other methods of ink jet printing are known and can be used for the marking device 6.

Alternatively, mechanical up-down motion of a pen can be used to implement a marking device. In such a case, it is desirable that, simultaneously with the pen acceleration in the down direction, a load, distributed coaxially with the pen, is accelerated in the up direction (and vice versa for the up pen motion). This assures that no net vertical force is exerted on the cylinder 37 and supporting cables 8a, 8b, 8c, and 8d. Such net force could cause transverse vibration which can have an adverse effect on the quality of the trace.

The design of digital servo drives is well known and is described in many articles and books such as *Digital Control Using Microprocessors* by Paul Katz, published by Prentice Hall International. The application of digital servo drives to x-y plotters is also well established as exemplified by articles in Hewlett-Packard Journal in October and November 1981 issues. This invention, however, comprises certain new and unique featues of the servo drive methodology which result in:

(a) controlled tension applied at all times to the cables to keep them tight, even if the marker 6 is stationary;

(b) simultaneous multi-mode control of all four crosscoupled drives needed for trajectory control.

Figure 6:
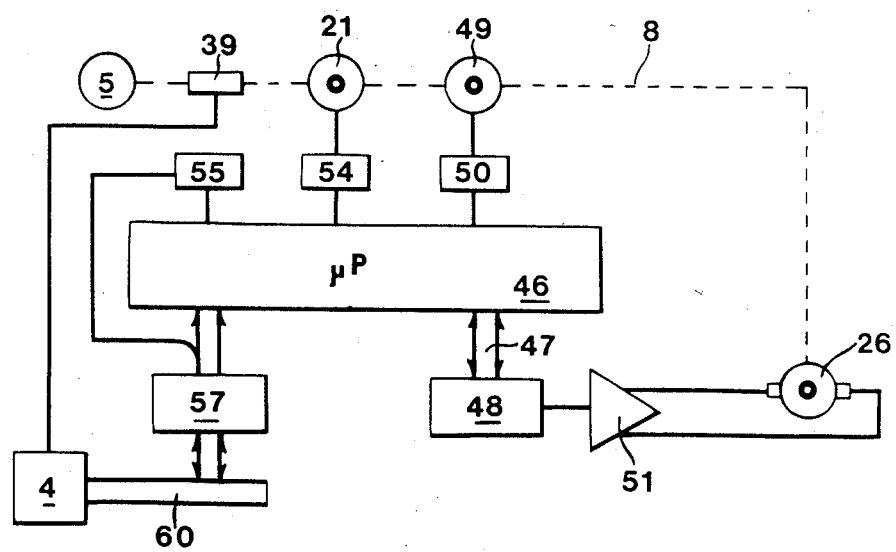
FIG. 6 shows an electronic block diagram of a link drive.

The block diagram of the electronics associated with each link drive 3 is shown in FIG. 6. A DC permanent magnet servo motor 26 is energized by a motor driver 51. Driver 51 is operated by the output of the D/A converter 48.

The motion of the cable 8 is sensed by an optical shaft encoder 21 acting as a length sensor. The velocity of cable 8 can be computed from the length sensor 21 and force sensor 39 feedback signals or, optionally, can be sensed directly by a tachometer 49 which is mounted on the same shaft as optical shaft encoder 21 and generates a feedback signal proportional to the rate of change of cable length. It should be noted that even though in FIG. 6 the motion between the motor 26 and marker housing 5 is, for the sake of simplicity, shown simply connected by the motion of cable 8, this is not, in fact, the case. The difference is due to the ball reverser winding mechanism 24 which introduces a variable path between the motor 26 and the marker housing 5. However, sensors 49, 21, and 39 represent the true motion parameters of the cable as they affect the marker housing 5.

The feedback signal from length sensor 21 is converted by signal processing circuit 54 and is inputed to the microcomputer 46. The force sensor 39 produces a feedback signal, proportional to cable tensioning force f, which after signal processing by circuit 55 is inputed via control unit 4 to the microcomputer 46.

In Length Mode, the servo error signal 47 from the microprocessor 46 is based on the difference between the actual position calculated from 54 and the desired position obtained from trajectory control unit 4 via the communication controller 57 and signal on the bus 60. This difference is combined for stability with velocity information as is typical for the second order servo systems. This signal passes unaltered provided that the cable tensioning force f, as measured by force sensor 39, is within limit $f_0 \leq f \leq f_1$ where $f_0$ is a specified minimum force and $f_1$ is a specified maximum force. If, however, $f > f_1$, the error signal is decreased so as to reduce the tensioning force. The above provision assures that there will be no damage due to excessive tension on the cable. If $f < f_0$, the error signal is increased providing adequate tension to properly support the marker housing. Out-of-bounds signal is transmitted to control unit 4.

In the $f_0$ Force Mode of operation, the servo loop compares the force f measured by the force sensor 39 with the minimum force $f_0$ so as to maintain $f \approx f_0$. In $f_1$ Force Mode the servo loop maintains $f \approx f_1$.

In the Velocity Mode the velocity V of cable 8, as detected by the tachometer 49 and processed by signal processor 50, is compared with the velocity value $V_c$ supplied by the trajectory control unit so as to maintain $V \approx V_c$.

Figure 7:
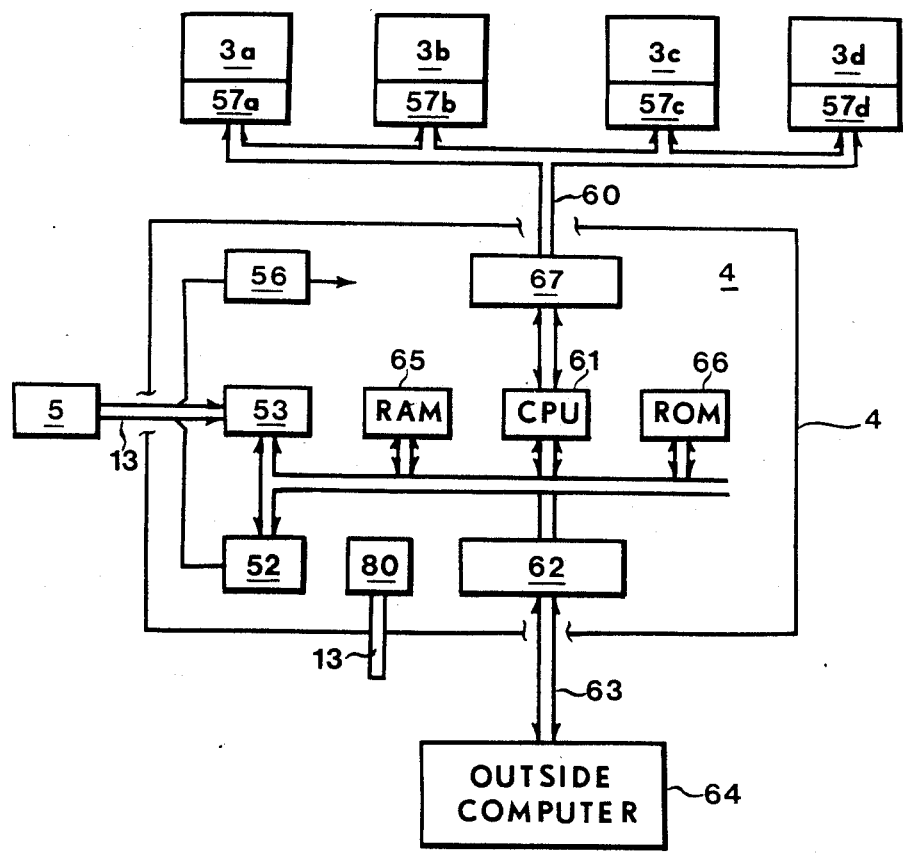
FIG. 7 shows an electronic block diagram of the trajectory control unit interconnected to the individual link drives and interfaced with the outside computer.

FIG. 7 shows the over-all electronic interconnections and the block diagram of the trajectory control unit 4. The central microprocessor 61 is connected via an external communication controller 62 to an external communication link 63, such as IEEE 488 bus, to receive the input data in the form of the plotter commands from the external computer 64. Input data are translated by the microprocessor 61 using a program stored in RAM 65, and in conjunction with ROM 66, into individual desired plot coordinates X, Y. This aspect of the program for the microprocessor 61 is well known and corresponds very closely to the programming done in most current microprocessor controller plotters.

The unique function of the microprocessor 61 is that the desired X, Y plot coordinates are in turn processed to control the system consisting of the four cross-coupled cable drives so as to produce the desired plot trajectory. The commands for individual cable drives are transmitted from microprocessor 61 through I/O interface controller 67 to the multi-processor bus 60, such as Intel Bitbus. The four link drive bus interface controllers 57a, 57b, 57c, and 57d are connected to bus 60 and interface to the drives 3a, 3b, 3c and 3d.

In addition, trajectory control unit includes high voltage supply and modulator 52 which generates the write command to the ink jet on demand by CPU 61. Further, it includes the force sensor feedback signal processing circuits 53 and the general power supply and power distribution network 56.

Figure 8:
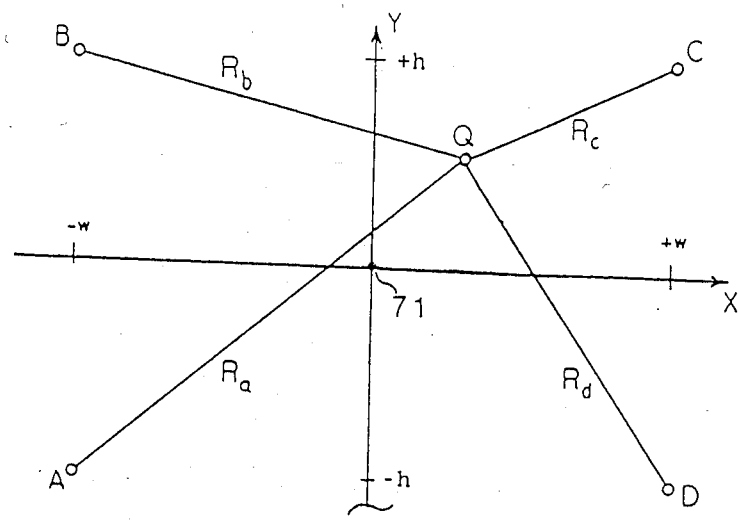
FIG. 8 shows the basic functional geometry of the plotter/digitizer.

In order to examine some geometrical aspects of the system link drive control, it is useful to represent board 1 and the four cables 8 by a simplified diagram. FIG. 8 represents such a simplified geometrical configuration of the plotter. Points A, B, C, and D coincide with the axes of rotation 12a, 12b, 12c, and 12d of drives A, B, C, and D respectively. Point Q is the axis 36 of marker 6. In the actual plotter in FIG. 1, cable 8a does not stretch in a straight line all the way between A and Q; however, the actual force on 8a is colinear with $\overline{AQ}$ because of the rotation of bearings 18 and 19. The result is that 12a and the axis 36 of marker 6 are always on a straight line. The same argument holds for the remaining cables.

The origin 71 of the x,y coordinates in FIG. 8 is an equal distance from points A, B, C, and D. The horizontal distance $\overline{AD}$ (and $\overline{BC}$) is parallel to the x axis and is 2w in length. The vertical distance $\overline{AB}$ (and $\overline{CD}$) is parallel to the y axis and 2h in length.

The new method of trajectory control of more than two link drives for prescribed two-dimensional (two degrees of freedom) motion is based on judicious section of two link drives for Length Mode operation and on use of the remaining drives for Force or Velocity Mode operation. Generalized to n degrees of freedom one appropriately selects $n$ drives for Length Mode operation and the remaining drives for Force or Velocity Modes operation.

Figure 10:
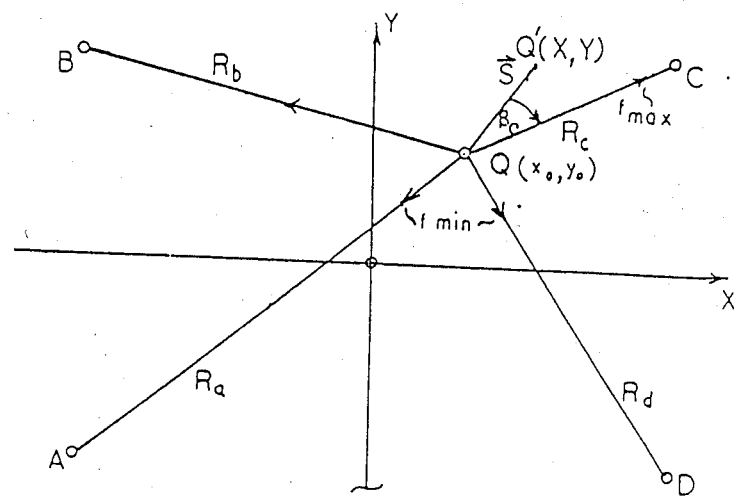
FIG. 10 illustrates the geometry of the trajectory control.
Figure 12:
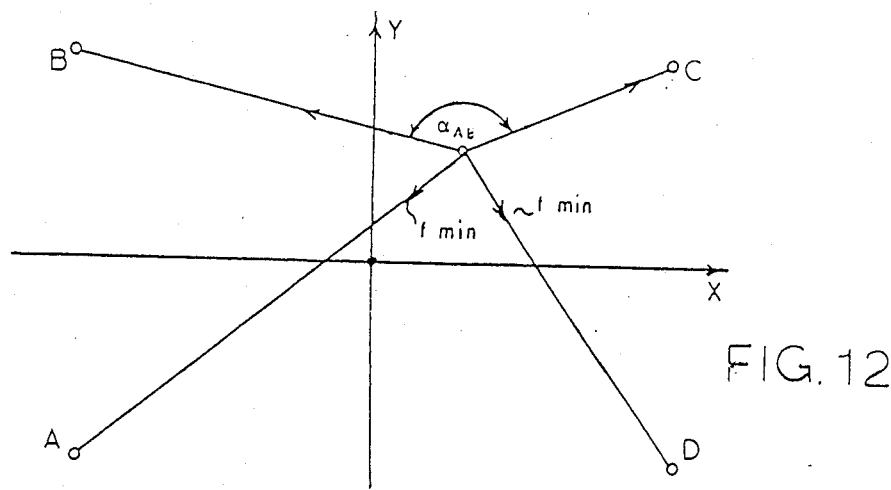
FIG. 12 shows the geometry of stationary control.
Figure 9:
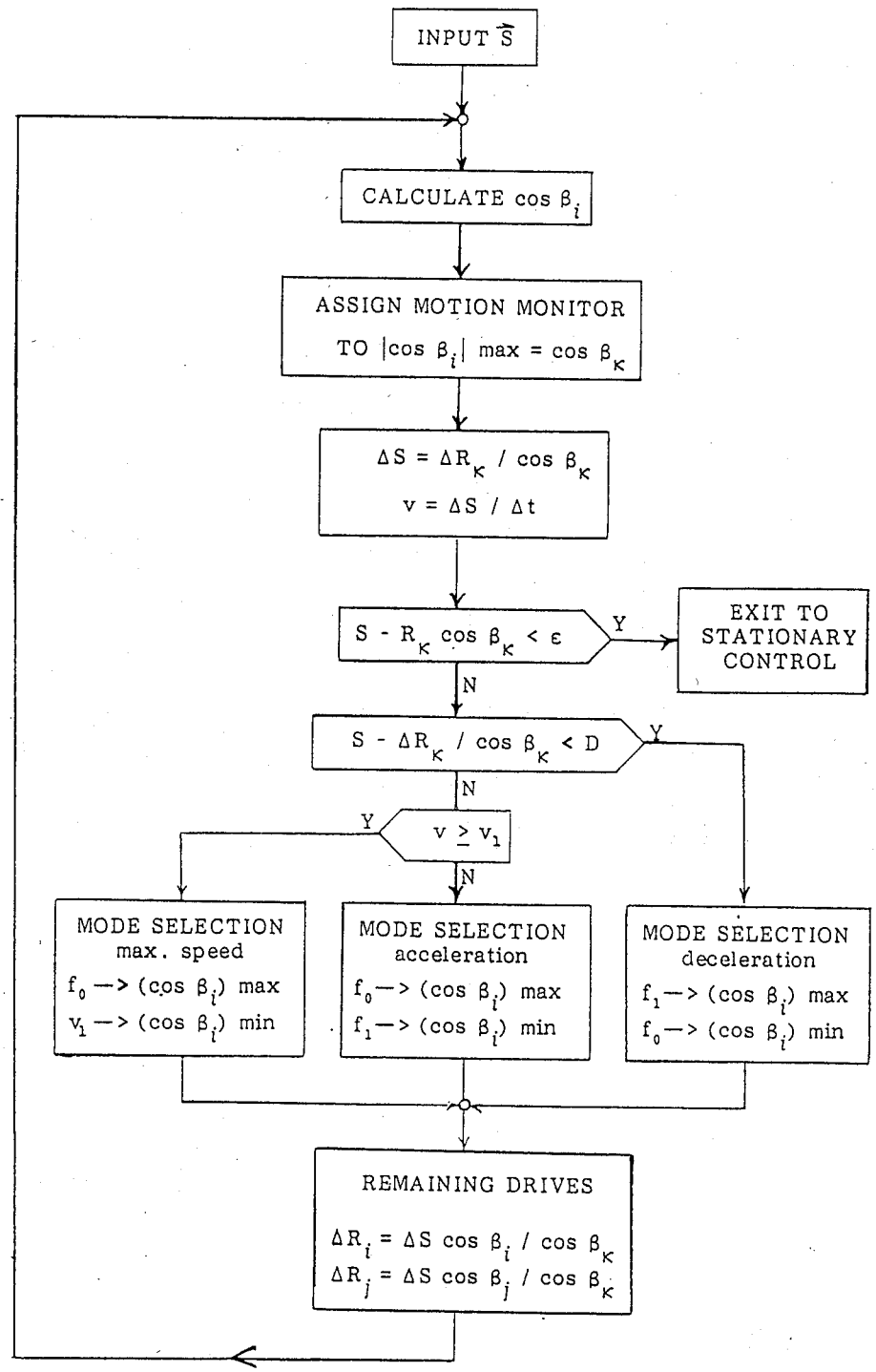
FIG. 9 shows the flow diagram of the trajectory control.
Figure 11:
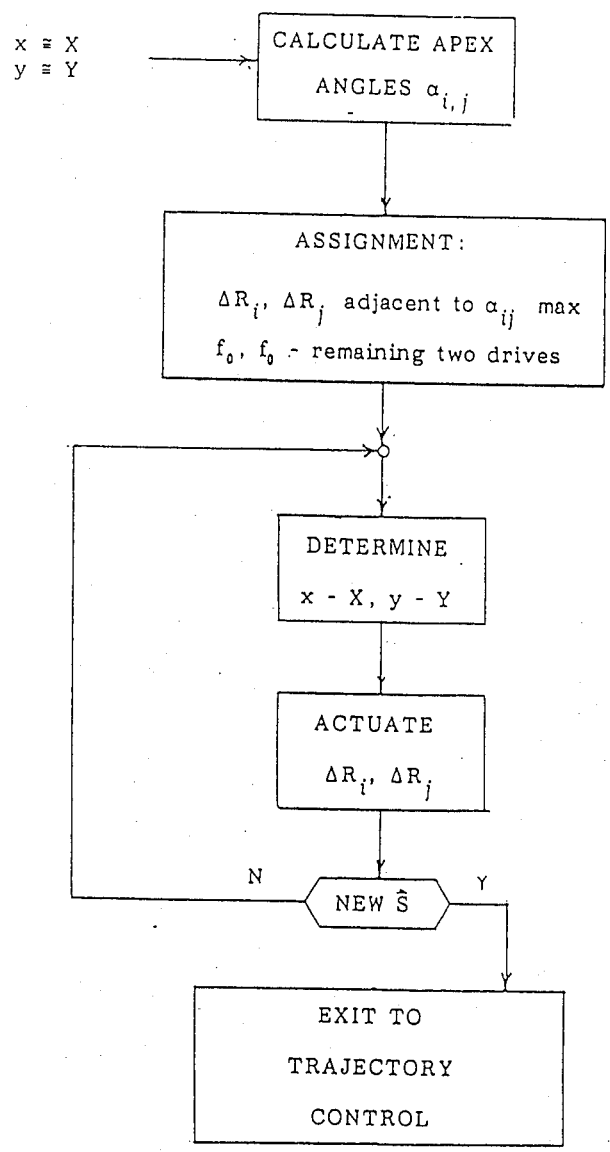
FIG. 11 shows the flow diagram of stationary control.

The trajectory control methodology is explained in the drive flow diagram in FIG. 9 and in the drive geometry in FIG. 10. In a typical plotting cycle the marker is stationary in the initial position $x_0$, $y_0$, and it is desirable to reach final coordinates X, Y of a trace segment in a straight line by accelerating as fast as possible to maximum velocity $v_1$, moving a $v_1$ and then quickly decelerating to X, Y position. This is accomplished using two trajectory control methods:

(1) Motion trajectory control which includes acceleration, deceleration, and high speed motion described in FIGS. 9 and 10, and
(2) Stationary control which includes standstill and low speed motion in the vicinity of end points, described in FIGS. 11 and 12.

When the motion along the trajectory segment is desired from the initial position of Q, defined by coordinates $x_0$, $y_0$ to the new position Q', defined by coordinates X, Y, it is convenient to define a vector $\vec{S}=\overline{QQ'}$ and to determine the angle $\beta_i$ between $\vec{S}$ and the individual cables. Index $i$ is generic and can be substituted by a, b, c, or d, as appropriate. The derivation of angles $\beta_i$ from cable lengths $R_i$ and $\vec{S}$ is presented in the Appendix. The projection of incremental motion $\Delta S$ of marker 6 along the vector $\vec{S}$ translates into change of length $\Delta R_i$ of the individual cables:

$$\Delta R_i = \Delta S \cos \beta_i \qquad (1)$$

Cosine $\beta_i$ is defined as action cosine for drive $i$.

The link drive with the largest absolute value of action cosine is designated by trajectory control unit 4 as the Motion Monitor drive and is designated by the subscript $\kappa$. Any one of the four drives can be so designated. The motion controlling role is based on the fact that the change in the controlling cable length $\Delta R_\kappa$ as a result of motion $\Delta S$ along the vector S is largest of all cables and therefore is used to estimate $\Delta S$:

$$\Delta S = \Delta R_\kappa / \cos \beta_{78} \qquad (2)$$

The desired change in cable length of the remaining cables is in turn determined by the microprocessor 61 from:

$$\Delta R_i = \Delta S \cos \beta_i = \Delta R_\kappa \cos \beta_i / \cos \beta_\kappa \qquad (3)$$

The ratio $\cos \beta_i / \cos \beta_\kappa$ is defined as the action ratio.

Mode command selection rules for trajectory control are shown in the flow diagrams in FIG. 9. In this operation, it is first desired to exert maximum acceleration in the direction of the vector $\vec{S}=QQ'$. This is accomplished by assigning Maximum Force Mode to the cable drive most closely aligned to vector $\vec{S}$, and hence the one with the largest negative action cosine. In FIG. 10, this is $\cos \beta_c$. The Minimum Force Mode is assigned to the cable drive most closely opposing $\vec{S}$, and hence largest positive action cosine ($\cos \beta_a$ in FIG. 10). Of the aligned and opposing cables, the one with the largest absolute value of $\cos \beta_i$ acts also as a motion controller drive and is designated, as mentioned before, by subscript $\kappa$. Either the aligned ($f_1$ mode) or the opposing $f_0$ mode) cable drive can have the motion controlling role depending on which of the two has the largest $|\cos \beta_i|$. The other two cables (B and D in FIG. 10) are operated as Length Mode drives.

Once the acceleration has resulted in maximum marker speed $v_1$ compatible with good trace quality, the Maximum Force Mode on drive C is changed by the Trajectory Control Unit to the Velocity Mode which reduces force on cable drive C below $f_1$ to a value which maintains $$dS/dt = (dR_c/dt)(1/\cos \beta_c) = V_1 \qquad (4)$$

When the motion is within a deceleration distance D from the final position X, Y, the trajectory control changes to maximum deceleration commands and the assignment of $f_1$ mode and $f_0$ mode reverses as compared to acceleration control: The minimum force is applied to the cable closest to the direction of $\vec{S}$, i.e.; cable $R_a$ in FIG. 10 and the maximum force $f_1$ is applied to the cable closest to the direction opposite to $\vec{S}$. In FIG. 10 this corresponds to link drive A. The Length Mode is maintained by the same cables B and D. Finally, when close to the end point, the mode switches to stationary control algorithm.

It can be seen that a device which is not capable of alternating the role of the drives is not effective. For example, the plotter of Landa, referred to earlier, cannot be effectively moved in the direction of the take-up reel. Such a system is slow and difficult to balance for good line quality.

In ordinary plotters, the command to remain stationary is implemented by de-energizing the motors. In the cable driven plotter, in order to remain stationary, the cables must be under at least minimum tension so that the marker housing is suspended above the plotting medium and there is no slack in cables when the motion is started again.

The algorithm of selection and control of link drives for stationary control is explained in connection with the flow diagram in FIG. 11 and cable geometry configuration in FIG. 12. The apex angle is defined as the angle formed by adjacent cables at Q. The cables corresponding to the largest apex angle are operated in the Length Mode. The remaining two drives are operated in the Minimum Force ($f_0$) Mode. The calculation of apex angles based on cable length is presented in the Appendix.

When the plotter is used as coordinate digitizer, the marker 6 in FIG. 4 and FIG. 5 is replaced by an optical sight in the marker housing 5. The housing is manually moved to the point to be digitized. All motor drives are in the $f_0$ mode. The x, y coordinates of the digitized point are derived from the reading of the shaft encoders representing the length of the individual cables, as derived in the Appendix.

Having thus described the principles of the invention, together with several illustrative embodiments thereof, it is to be understood that although specific implementation terms are employed, they are used in a generic and descriptive sense, the scope of the invention being set forth in the following claims.

APPENDIX

Based on the geometry of the plotting system in FIG. 8, the cable lengths R can be derived in terms of the x, y coordinates of point Q by the following four equations:

$$R_a^2 = (w+x)^2 + (h+y)^2 \quad \text{(A-1)}$$

$$R_b^2 = (w+x)^2 + (h-y)^2 \quad \text{(A-2)}$$

$$R_c^2 = (w-x)^2 + (h-y)^2 \quad \text{(A-3)}$$

$$R_d^2 = (w-x)^2 + (h+y)^2 \quad \text{(A-4)}$$

The converse calculation of the two x, y coordinates of point Q from the four cable lengths $R_a$, $R_b$, $R_c$, and $R_d$ involve redundant information which is used to verify the accuracy of calculation. From Eqs. (A-2) and (A-3):

$$x_1 = (R_b^2 - R_c^2)/4w \quad \text{(A-5)}$$

From Eqs. (A-1) and (A-4):

$$x_2 = (R_a^2 - R_d^2)/4w \quad \text{(A-6)}$$

Ideally the two values $x_1$ and $x_2$ should be equal, and usually they are in fact close. The value of x is then determined from the average:

$$x = (x_1 + x_2)/2 \quad \text{(A-7)}$$

However, if the absolute value of $x_1 - x_2$ exceeds a specified maximum, an error routine is envoked in place of the calculation of Eq. (A-7).

Similarly, the instantaneous y coordinate is determined from Eq. (A-1) through Eq. (A-4):

$$y_1 = (R_a^2 - R_b^2)/4h \quad \text{(A-8)}$$

$$y_2 = (R_d^2 - R_c^2)/4h \quad \text{(A-9)}$$

$$y = (y_1 + y_2)/2 \quad \text{(A-10)}$$

The base angle $\alpha$ is defined as the angle between cable force and positive x direction:

$$\alpha_a = \pi + \tan^{-1}[(h+y)/(w+x)] \quad \text{(A-11)}$$

$$\alpha_b = \pi - \tan^{-1}[(h-y)/(w+x)] \quad \text{(A-12)}$$

$$\alpha_c = \tan^{-1}[(h-y)/(w-x)] \quad \text{(A-13)}$$

$$\alpha_d = -\tan^{-1}[(h+y)/(w-x)] \quad \text{(A-14)}$$

where $\pi = 180°$.

Apex angles between cables can be derived from the difference of base angles.

The direction of the motion vector $\vec{S}$ originating at x, y and terminating at X, Y is specified by angle $\theta$:

$$\theta = \tan^{-1}[(Y-y)/(X-x)] \quad \text{(A-15)}$$

The action angles $\beta_i$ are obtained from the difference between the cable force $\alpha_i$ and the direction of motion angle $\theta$ $$\beta_i = \alpha_i - \theta$$

What is claimed is:

1. A plotter comprising
   a plotting surface covered by a marking sheet when in operation,
   a marker which on a write command marks a trace on the marking sheet,
   a marker housing which supports the marker,
   flexible links, each connecting the marker housing to a motor,
   a flexible link guiding mechanism which guides the flexible link between the marker and the motor,
   sensors attached to each said flexible link which convert length parameters of the flexible link into corresponding feedback signals,
   force sensor attached to each said flexible link which converts tension on the flexible links into a corresponding feedback signal,
   trajectory control means which accept input data and said feedback signals, calculate operational parameters to control said motors and generate said write command so as to mark the trace on the marking sheet corresponding to said input data.

2. A plotter in accordance with claim 1, wherein said trajectory control means calculate a distance between a desired end point of a trace segment and a marker position and depending on a value of said distance, alternate between a motion control algorithm and a stationary control algorithm.

3. A plotter in accordance with claim 1, wherein the trajectory control means generate modes of operation controlling the motors, said modes derived from said input data and said feedback signals.

4. A plotter in accordance with claim 3, wherein one of said modes of operation causes a force exerted by the motor on the flexible link to be controlled by a rate of change of a length of the flexible link.

5. A plotter in accordance with claim 3, wherein one of said modes of operation causes a force exerted by the motor on the flexible link to be controlled by a discrepancy between an actual marker position and a desired marker position.

6. A plotter in accordance with claim 3, wherein one of said modes of operation causes a force exerted by the motor on the flexible link to equal substantially to a minimum preset tension.

7. A plotter in accordance with claim 3, wherein one of said modes of operation causes a force exerted by the motor on the flexible link to equal substantially to a maximum preset tension.

8. A plotter in accordance with claim 1, wherein said marker is exchanged for a sight to allow sighting of the plotting surface, while said tension sensors monitor minimum preset tension on flexible links and, as the marker housing is manually moved, said length parameter sensors supply position information of a sighted point, thus converting the plotter to a digitizer.

9. A positioning device comprising
a movable load,
flexible links, each connecting the load to a motor,
a flexible link guiding mechanism which guides motion of the flexible link between the load and said motor,
sensors connected to each said flexible link which convert length parameters of said flexible link into corresponding feedback signals,
force sensor connected to each said flexible link which converts tension on the flexible link into a corresponding feedback signal,
trajectory control means which accept input data and said feedback signals and calculate operational parameters to control said motors so as to move said load corresponding to said input data.

10. A plotter in claim 1, wherein said flexible link guiding mechanism includes a winding mechanism for controlled winding and unwinding of the flexible link.

* * * * *